May 18, 1926.

J. POHL 1,584,803

SPRING DEVICE

Filed August 23, 1924

Inventor
Joseph Pohl
By Herbert E. Smith
Attorney

Patented May 18, 1926.

1,584,803

UNITED STATES PATENT OFFICE.

JOSEPH POHL, OF SPOKANE, WASHINGTON.

SPRING DEVICE.

Application filed August 23, 1924. Serial No. 733,727.

My present invention relates to improvements in spring devices of the compound leaf and coil type, and embodied in an automobile or automotive vehicle in the form of an overload spring. The invention is especially adapted for use in connection with the type of automotive trucks and similar vehicles that travel over rough roads and are subjected to lateral swaying movements due primarily to the irregularities and roughness of the road. This lateral swaying movement throws the weight of the load alternately from side to side of the vehicle and consequently imposes an overload on the usual longitudinally disposed leaf springs which results in frequent breaking of the springs. To receive and support this overload and to relieve the usual leaf springs of the truck from the weight of the overload, a coil spring device is utilized in combination with the leaf spring, which coil spring device is normally inoperative, but becomes operative under overload conditions to support the excess weight imposed on the leaf springs.

My invention consists in certain novel combinations and arrangements of parts involving the leaf spring and the coil spring device as will hereinafter be more fully pointed out and claimed.

In the accompanying drawings I have illustrated one complete example of the physical embodiment of my invention wherein the parts are combined and arranged according to the best mode I have so far devised for the practical application of the principles of my invention.

Figure 1 is a view in elevation showing one of the combined leaf and coil spring devices in position upon an automotive truck.

Figure 2 is an enlarged detail vertical sectional view of the spring device, taken transversely of the automotive vehicle.

Figure 3 is a perspective view of one of the spring blocks for supporting the coil spring device.

Figure 4 is a perspective view at the top of one of the pair of coil springs utilized in carrying out my invention.

Figure 5 is an enlarged detail sectional view showing the manner of anchoring the lower end of one of the coil springs of the spring device.

Figure 6 is a plan view of a modified form of device for anchoring the coil springs.

In order that the construction and operation of the spring device may readily be understood I have indicated in the drawings a portion of a side bar 1 of a truck frame and the usual form of inverted leaf spring 2 suspended therefrom by brackets 3 and 4 and shackles 4' in well known manner. One of the truck wheels is indicated at 5 and its journal 6 is provided with a conventional type of journal block 7 connected to the leaf spring by means of a pair of U-bolts 8.

In carrying out my invention I utilize in combination with the leaf spring a pair of telescoping coil springs 9 and 10 one of which has a fixed lower end and a free upper end and the other has a fixed upper end and a free lower end. The inner spring 9 and the outer spring 10 brace each other against lateral movement and the free ends of these respective springs terminate a suitable distance from the fixed opposite end of a complementary spring. This arrangement of the coil spring device permits the leaf spring to function under normal conditions in its usual manner, while the coil springs function only under excess or overload conditions.

The larger outer spring 10 is anchored at its lower end on a spring block 11 which is longitudinally disposed on the top of the leaf spring directly over the journal block 7, and transverse grooves 12 are provided in the upper face of the spring block to accommodate the U-bolts 8 which rigidly hold the journal block, leaf spring and spring block together.

Above the spring block and resting thereon is a base plate 13 for the spring 10, said plate being provided with a central slot 14. The base plate is bolted on the top of the spring block by means of a pair of bolts 15 and the spring block is fashioned with a central recess 16 directly below the slot 14 of the plate. A staple 17 is employed to anchor the lower end of the spring 10 with its ends 18 passing through the slotted base plate and into the recess 16 of the spring block. This staple as best seen in Figure 5 embraces the straightened transversely extending end 19 of the spring 10, and by means of the outwardly extending ends 18 of the staple the lower end of the spring 10 is anchored to the spring plate which is rigid with the spring block 11.

The upper end of the inner coiled spring 9 is anchored to and the spring 9 is supported to depend from the underside of a bunk or transversely disposed bolster 20 of the truck, said bolster being affixed to the side bar 1 of the truck frame by U-bolts as 21 in usual manner. The end of the bunk or bolster projects outwardly from the frame bar 1 directly over the journal of the wheel and the longitudinal center of the leaf spring 2.

Beneath this projecting end of the bunk at its under side is affixed an anchoring plate 22 which is bolted at 23 to the bunk. The anchoring plate is fashioned with a central slot 24 and a staple 25, which embraces the straight end 26 of the spring 9, has its bent ends 27 located in a socket 28 formed in the underside of the bunk above the slot 24 of the anchoring plate. In this manner the inner coil spring 9 at its upper end is anchored to the bunk or bolster, and the lower end of said spring, which end is free, terminates above the staple 17 which anchors the larger coil spring 10.

From the above description taken in connection with my drawings it will be apparent that when an overload, or a weight in excess of the normal weight to be supported, is imposed on the truck, the two coil springs will telescope. Under sufficient load the free end of the larger spring will receive the weight of the bunk and the free end of the smaller inner coil spring will bear down upon the staple 17 and adjoining parts to relieve the leaf spring of the excess weight imposed thereon and thus prevent or eliminate danger of breaking the latter spring.

In Figure 6 a modified form of base plate 29 is used for the fixed lower end of the spring 30, and the end 31 of this spring is coiled about and secured to a pin or center bolt 32. In some instances this means of anchoring the fixed ends of the two springs may be employed to advantage.

Having thus fully described my invention, what I claim as new and desire to secure by Letters Patent is—

1. The combination with a leaf spring and frame and a spring block fixed to the leaf spring, of a coil spring and means for attachment to said block, said coil spring having a normally free upper end, a fixed member of the frame, and a coil spring anchored to and suspended from said member and having a free end telescoping within the first coil spring.

2. The combination with a leaf spring and frame and a spring block fixed to said leaf spring, of a pair of telescoping coil springs having free ends and one of said springs anchored to said frame, a bent end on the other spring, a slotted spring plate attached to said block, and a staple embracing said bent end and having its ends anchored in said slotted spring plate.

3. The combination with a pair of telescoping coil springs having each a free end, of a pair of fixed slotted anchoring plates, a staple having its ends anchored in each slotted plate, and a bent end on each spring embraced by said staples.

In testimony whereof I affix my signature.

JOSEPH POHL.